(12) United States Patent
Hiratsuka

(10) Patent No.: US 10,433,167 B2
(45) Date of Patent: Oct. 1, 2019

(54) INFORMATION PROCESSING DEVICE AND INFORMATION PROCESSING METHOD

(71) Applicant: SONY CORPORATION, Tokyo (JP)

(72) Inventor: Yosuke Hiratsuka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 305 days.

(21) Appl. No.: 14/293,113

(22) Filed: Jun. 2, 2014

(65) Prior Publication Data

US 2014/0372612 A1 Dec. 18, 2014

(30) Foreign Application Priority Data

Jun. 14, 2013 (JP) ................................ 2013-125827

(51) Int. Cl.
*H04W 12/06* (2009.01)
*H04L 12/28* (2006.01)
*H04W 4/70* (2018.01)

(52) U.S. Cl.
CPC ........... *H04W 12/06* (2013.01); *H04L 12/282* (2013.01); *H04W 4/70* (2018.02)

(58) Field of Classification Search
None
See application file for complete search history.

(56) References Cited

U.S. PATENT DOCUMENTS

| | | | | |
|---|---|---|---|---|
| 2009/0210702 A1* | 8/2009 | Welingkar | ............... | H04L 9/321 713/156 |
| 2010/0211932 A1* | 8/2010 | Jones | ........................ | G06F 8/20 717/124 |
| 2011/0072266 A1* | 3/2011 | Takayama | ............. | G06F 21/445 713/169 |
| 2011/0314301 A1* | 12/2011 | Elder | .................... | H04L 9/0877 713/189 |
| 2012/0110646 A1* | 5/2012 | Ajitomi | ................. | G06F 21/335 726/4 |
| 2012/0253662 A1* | 10/2012 | Iguchi | ................ | G01C 21/3667 701/428 |
| 2013/0111565 A1* | 5/2013 | Wen | ........................ | G06F 21/51 726/4 |

(Continued)

FOREIGN PATENT DOCUMENTS

JP 2010212922 A * 9/2010
JP 20120212922 A * 9/2010

*Primary Examiner* — Sargon N Nano
*Assistant Examiner* — Christopher B Robinson
(74) *Attorney, Agent, or Firm* — Chip Law Group

(57) ABSTRACT

There is provided an information processing device including an obtaining unit configured to obtain, from a user terminal, developer identification information, and access control information for controlling whether or not one or more functions possessed by the information processing device are permitted to be executed, the developer identification information and the access control information being related to an application program possessed by the user terminal, a determination unit configured to determine whether or not a developer of the application program indicated by the developer identification information is a developer who has made an advance request for authorization for use, and a control unit configured to control execution of at least a portion of the one or more functions based on the access control information, based on the result of the determination by the determination unit.

8 Claims, 8 Drawing Sheets

(56) References Cited

U.S. PATENT DOCUMENTS

| | | | | |
|---|---|---|---|---|
| 2013/0346742 A1* | 12/2013 | Tada | .................... | H04L 63/0823 |
| | | | | 713/155 |
| 2014/0153724 A1* | 6/2014 | Kim | .................... | H04L 63/0428 |
| | | | | 380/270 |
| 2014/0344877 A1* | 11/2014 | Ohmata | ................. | H04H 60/14 |
| | | | | 725/110 |

* cited by examiner

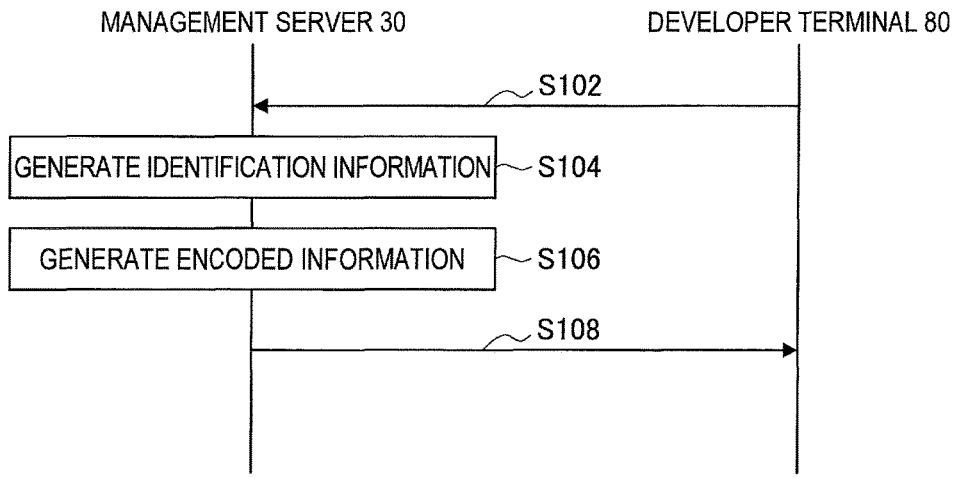
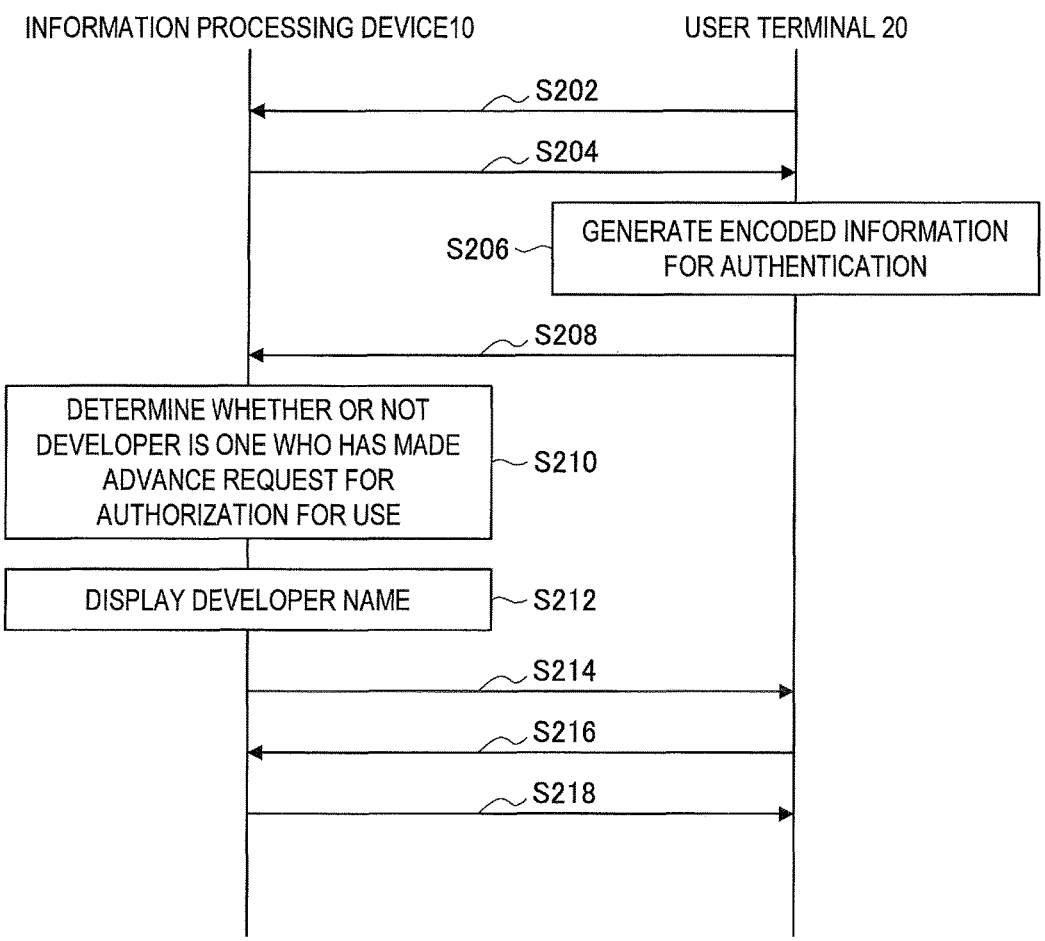

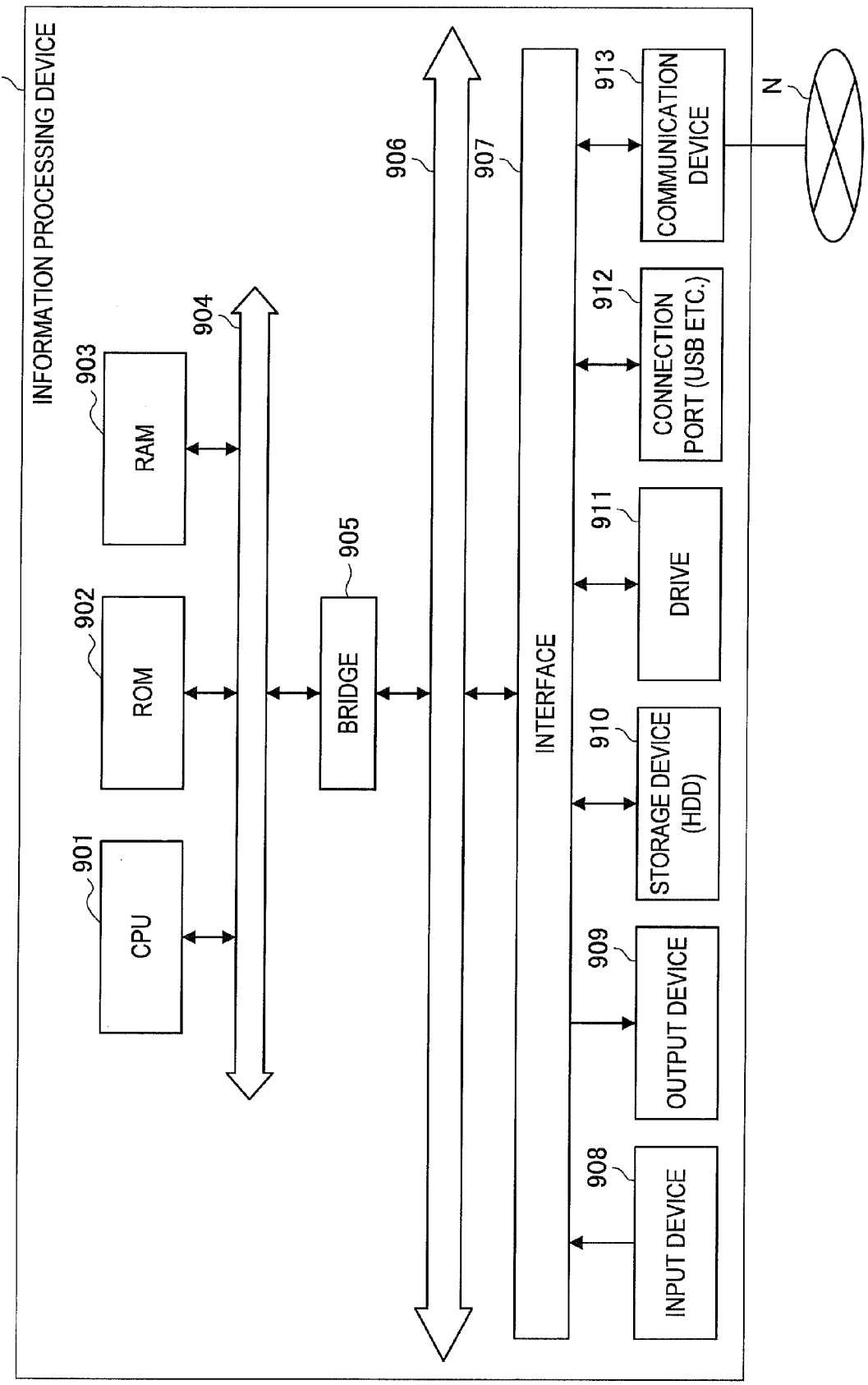

INFORMATION PROCESSING DEVICE AND INFORMATION PROCESSING METHOD

CROSS REFERENCE TO RELATED APPLICATIONS

This application claims the benefit of Japanese Priority Patent Application JP 2013-125827 filed Jun. 14, 2013, the entire contents of which are incorporated herein by reference.

BACKGROUND

The present disclosure relates to information processing devices, information processing methods, and programs.

The function of operating a device such as a digital camera, a television device, etc. or an information processing device such as a personal computer (PC) etc. using a user terminal such as a smartphone has in recent years been provided.

The function of operating an information processing device using a user terminal is, for example, implemented by installing a dedicated application program (hereinafter simply referred to as an "application") in the user terminal.

An application programming interface (API) which is a program for controlling an operation of an information processing device may be provided to general developers in order to allow them to develop an application which controls the operation of the information processing device.

See, for example, JP H10-83310A.

SUMMARY

Of APIs provided as described above, some APIs may be made public to general developers, while some other APIs may be made available only to particularly licensed developers or developers who pay fees for the use of the APIs. Therefore, there has been a demand for a scheme of changing the publishing range of APIs, i.e., a limitation on the use of functions provided by an information processing device, depending on developers.

However, if an application produced by a developer who is not authorized to use APIs may have identification information indicating a developer (hereinafter also referred to as a "developer identification information") in which the developer pretends to be another developer who is authorized to use the APIs, the application can use, without authorization, the APIs which the developer is not authorized to use.

Under the above circumstances, the present disclosure proposes a novel and improved information processing device, information processing method, and program which can limit the use of a function, depending on developers, and deter the unauthorized use of the function.

According to an embodiment of the present disclosure, there is provided an information processing device including an obtaining unit configured to obtain, from a user terminal, developer identification information, and access control information for controlling whether or not one or more functions possessed by the information processing device are permitted to be executed, the developer identification information and the access control information being related to an application program possessed by the user terminal, a determination unit configured to determine whether or not a developer of the application program indicated by the developer identification information is a developer who has made an advance request for authorization for use, and a control unit configured to control execution of at least a portion of the one or more functions based on the access control information, based on the result of the determination by the determination unit.

As described above, the information processing device of the embodiment of the present disclosure obtains developer identification information related to an application program from a user terminal, and controls execution of its own function, depending on whether or not a developer indicated by the obtained developer identification information is a developer who has made an advance request for authorization for use. By thus presenting the developer, even when the function is used without authorization, by a developer who pretends to be another developer who is authorized, an actual developer indicated when the application program is provided does not match a developer presented when the function is used, and therefore, unauthorized use can be detected. Because unauthorized use by a developer who pretends to be another developer who is authorized is thus detected, unauthorized use can be deterred.

According to an embodiment of the present disclosure, there is provided an information processing method including obtaining, from a user terminal, developer identification information, and access control information for controlling whether or not one or more functions possessed by the information processing device are permitted to be executed, the developer identification information and the access control information being related to an application program possessed by the user terminal, determining whether or not a developer of the application program indicated by the developer identification information is a developer who has made an advance request for authorization for use, and controlling execution of at least a portion of the one or more functions based on the access control information, based on the result of the determining.

According to an embodiment of the present disclosure, there is provided a program for causing a computer to execute obtaining, from a user terminal, developer identification information, and access control information for controlling whether or not one or more functions possessed by the information processing device are permitted to be executed, the developer identification information and the access control information being related to an application program possessed by the user terminal, determining whether or not a developer of the application program indicated by the developer identification information is a developer who has made an advance request for authorization for use, and controlling execution of at least a portion of the one or more functions based on the access control information, based on the result of the determining.

As described above, according to the present disclosure, an information processing device, information processing method, and program are provided which can limit the use of a function, depending on developers, and deter the unauthorized use of the function.

BRIEF DESCRIPTION OF THE DRAWINGS

FIG. 8 is a sequence diagram showing a series of operations of the management server of the embodiment;

FIG. 9 is a sequence diagram showing a series of operations of the information processing device of the embodiment; and FIG. 10 is an explanatory diagram showing an example hardware configuration of an information processing device according to an embodiment of the present disclosure.

DETAILED DESCRIPTION OF THE EMBODIMENT(S)

Figure 1:
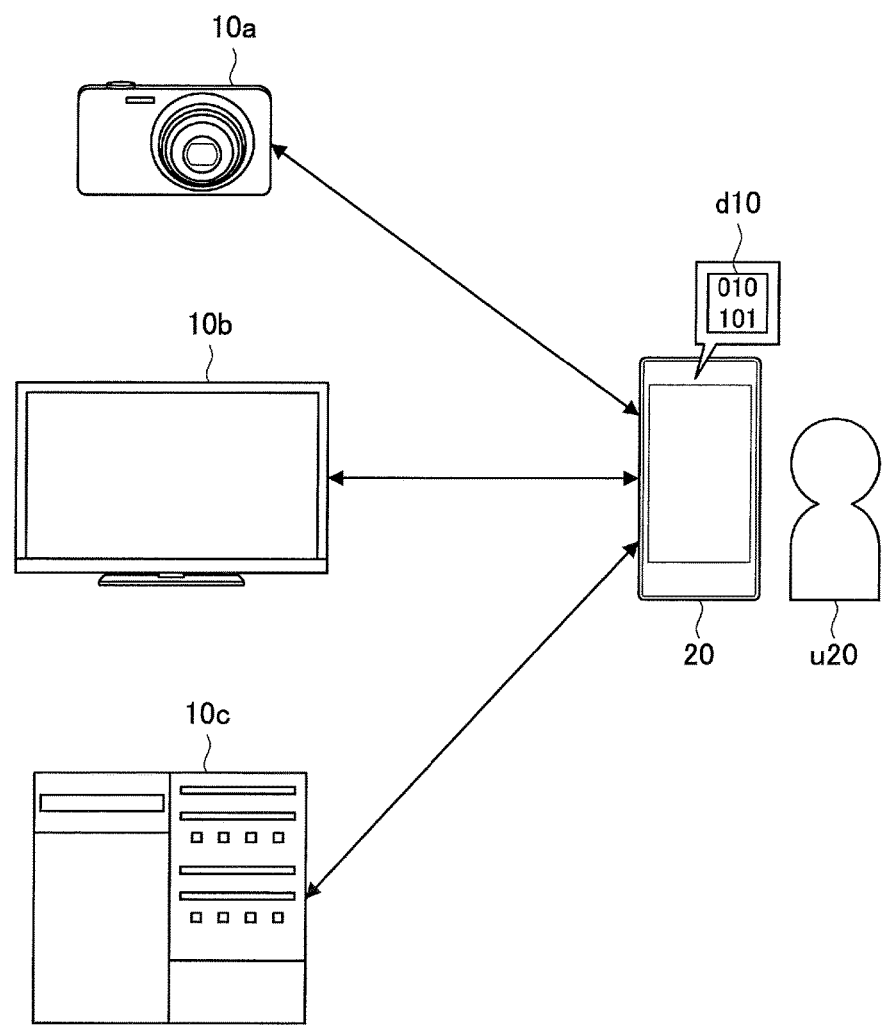
FIG. 1 is a diagram for describing a field to which an information processing system according to an embodiment of the present disclosure can be applied.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order:

1. Brief Description of Problems
2. Overview
3. Configuration
4. Process
5. Hardware Configuration
6. Summary

1. Brief Description of Problems

Firstly, problems which are overcome by an information processing system according to an embodiment of the present disclosure will be described with reference to FIG. 1. FIG. 1 is a diagram for describing a field to which the information processing system of the embodiment of the present disclosure can be applied.

As shown in FIG. 1, the function of operating a device, such as a digital camera 10*a*, a television device 10*b*, etc., or an information processing device 10*c*, such as a personal computer (PC) etc., using a user terminal 20, such as a smartphone, has in recent years been provided. Note that, in the description that follows, the digital camera 10*a*, the television device 10*b*, and the information processing device 10*c* may be collectively referred to as "information processing devices 10."

The technique of operating the information processing devices 10 using the user terminal 20 is, for example, implemented by installing a dedicated application d10 in the user terminal 20, and controlling an operation of the information processing devices 10 via the application d10.

An API for controlling operations of the information processing devices 10 may be provided to general developers to allow them to develop the application d10 which controls the operation of the information processing devices 10.

Of APIs provided as described above, there may be a variety of APIs including an API for controlling a basic operation, an API for allowing for a fine control, an API for achieving an additional function, etc. Of these APIs, some APIs may be made public to general developers, while some other APIs may be made available only to particularly licensed developers or developers who pay fees for the use of the APIs. Therefore, there has been a demand for a scheme of changing the publishing range of APIs, i.e., a limitation on the use of functions provided by the information processing devices 10, depending on developers.

However, if an application produced by a developer who is not authorized to use APIs may have identification information indicating a developer (hereinafter also referred to as a "developer identification information") in which the developer pretends to be another developer who is authorized to use the APIs, the application can use, without authorization, the APIs which the developer is not authorized to use. Therefore, there has also been a demand for a technology of deterring the unauthorized use of APIs by a developer who pretends to be another developer who is authorized.

An example technique of deterring the unauthorized use of APIs is to encrypt information exchanged between the user terminal 20 and the information processing devices 10 using a key exchange scheme, thereby reducing or preventing eavesdropping on a communication channel. However, an application downloaded to the user terminal 20, such as a smartphone, is likely to be disassembled. The same applies to key information which is stored in the user terminal 20 in order to encrypt information. If the key information is disassembled and published without authorization, protection of information based on encryption may be meaningless.

Alternatively, for example, a control of access to APIs may be achieved by managing authorization information for each developer at an external server etc. instead of the information processing devices 10 or the user terminal 20, and allowing the information processing devices 10 to reference the authorization information at the server. However, some information processing devices 10, such as a digital camera etc., do not have an interface for accessing an external network, such as the Internet etc. Thus, it may be difficult to access the external server all the time. It may also be difficult for the user terminal 20 to access the external server all the time. For example, some user terminals 20 cannot access an external network when they are communicating directly with the information processing devices 10, such as a digital camera etc., based on a technology, such as wireless fidelity (Wi-Fi) (registered trademark).

For some information processing devices 10 which are not supposed to access an external network, internal information is updated by, for example, firmware update etc., and therefore, it may be difficult to update the internal information as appropriate. Therefore, for example, the technique of storing, at the information processing devices 10, information for determining authorization to APIs with respect to a particular developer, may not be practical.

Alternatively, a certificate (e.g., a digital certificate) which is given to an application itself to indicate authenticity, and the authenticity of authorization to access APIs may be determined based on the certificate. However, when a certificate attached to an application operated in the user terminal 20 is checked at the information processing devices 10, it is necessary to transmit the application itself to the information processing devices 10, leading to an increase in the effort for launching the application.

Under these circumstances, there has been a demand for a scheme of, even when information in the user terminal 20 is referenced, deterring the unauthorized use of APIs by a developer who pretends to be another developer who is authorized, irrespective of whether or not the information processing devices 10 can be connected to an external network.

Therefore, the present disclosure proposes an information processing system which can limit the use of APIs, depending on developers, and deter the unauthorized use of APIs by a developer who pretends to be another developer who is authorized.

2. Overview

Next, an overview of the information processing system of this embodiment will be described. The information processing system of this embodiment provides a scheme for publishing APIs 50 involved in controlling operations of an information processing device 10 to a developer u50 so that the developer u50 can develop an application d10 for controlling an operation of the information processing device 10.

(System Configuration)

Figure 2:
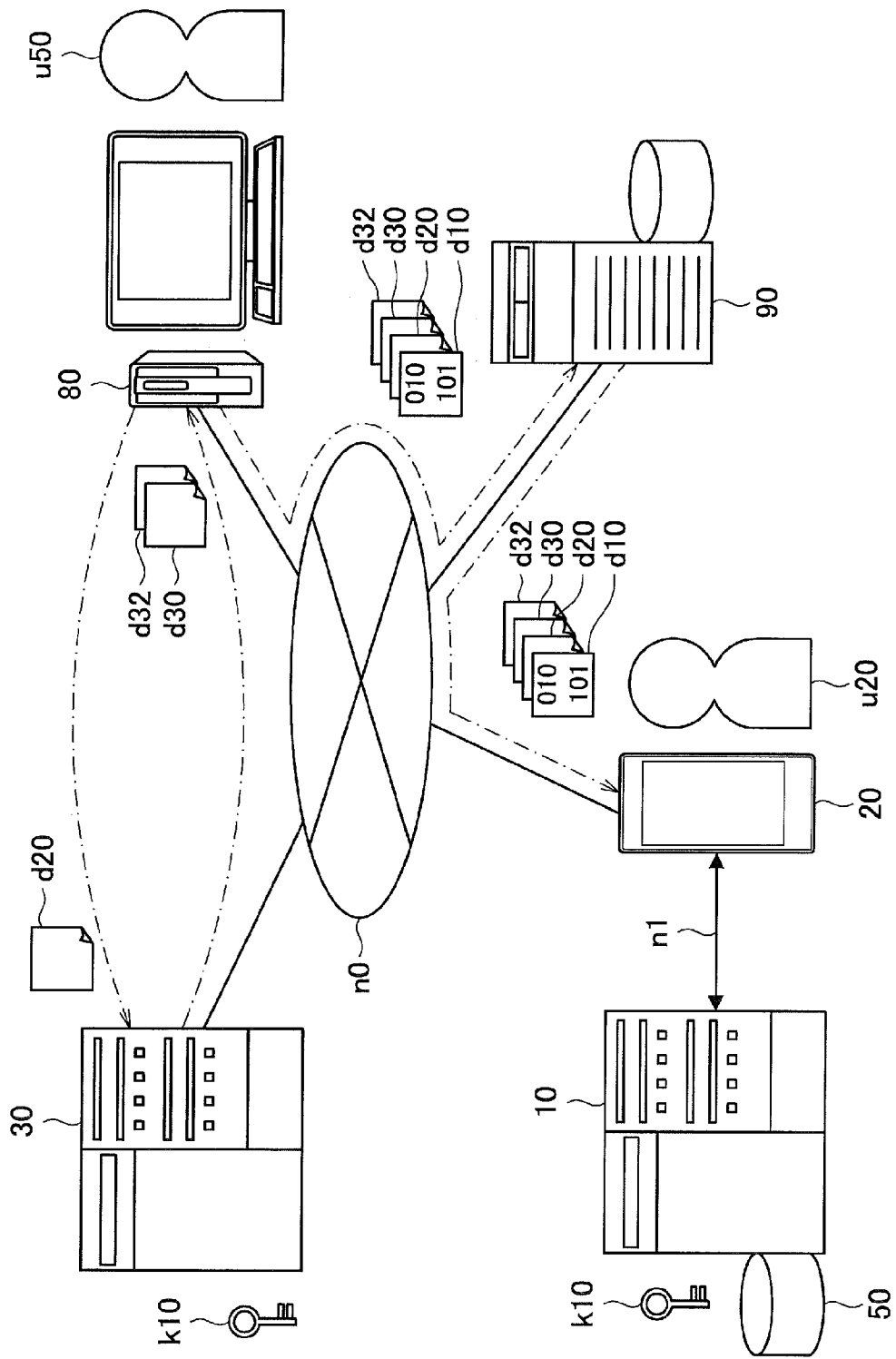
FIG. 2 is a diagram schematically showing an example system configuration of the information processing system of the embodiment.

Here, refer to FIG. 2. FIG. 2 is a diagram schematically showing an example system configuration of the information processing system of this embodiment.

As shown in FIG. 2, the information processing system of this embodiment includes an information processing device 10, a user terminal 20, a management server 30, a developer terminal 80, and an application providing server 90.

The developer terminal 80 illustrates a terminal at which the developer u50 develops an application d10. The application providing server 90 schematically illustrates a server for providing the application d10 developed by the developer u50 to a general user u20 with or without payment. A specific example of the application providing server 90 is a server which provides a delivery channel, such as an application store. For example, the user terminal 20 obtains the application d10 published at the application providing server 90 by downloading it from the application providing server 90.

Note that the technique of providing the application d10 via the application providing server 90 is only for illustrative purposes. The information processing system of this embodiment may have any configuration that allows the user terminal 20 to obtain the application d10 developed by the developer u50. For example, the application d10 may be stored in a portable medium etc., which is provided to the user u20. In this case, the application d10 is stored into the user terminal 20 by the user u20 installing the application d10 stored in the portable medium into the user terminal 20.

The management server 30, the developer terminal 80, the application providing server 90, and the user terminal 20 are connected together via a network n0. The network n0 is, for example, configured by the Internet, a dedicated line, a local area network (LAN), a wide area network (WAN), etc. Note that the network n0 may be in any form in which different devices are connected together via the network. Some of the management server 30, the developer terminal 80, the application providing server 90, and the user terminal 20 may be connected together via a network which is physically or logically different from another network for the other devices. As a specific example, the connection between the management server 30 and the developer terminal 80 may be separated from an external network, such as the Internet, by using the virtual private network (VPN) technology.

The information processing device 10 illustrates a control object whose operation is controlled by the application d10 being executed at the user terminal 20. The information processing device 10 and the user terminal 20 are connected together via a network n1. The network n1 is, for example, a wireless communication channel in direct communication between devices, such as Wi-Fi. Although, in the description that follows, the network n1 is described as a wireless communication channel in direct communication between the information processing device 10 and the user terminal 20, the network n1 may be in any form that allows communication to be established between the information processing device 10 and the user terminal 20.

The information processing device 10 stores APIs 50 for controlling operations thereof, and executes a corresponding program (API) of the APIs 50 according to an instruction from the user terminal 20 which is based on execution of the application d10.

(Control of Access to API)

In the information processing system of this embodiment, the information processing device 10 controls access to each of the APIs 50 from the application d10, based on the status of the developer u50's request for authorization to use the APIs 50 for control of operations thereof. An overview of a control of access to each of the APIs 50 in the information processing system of this embodiment will now be described.

In the information processing system of this embodiment, based on the request for authorization for use from the developer u50, the management server 30 issues, to the developer u50, access control information d30 for cancelling a limitation on one or more of the APIs 50 for which the request for authorization for use has been approved.

Specifically, the management server 30 obtains a developer name d20 of the developer u50 specified by the developer u50, and a list of one or more of the APIs 50 which are to be used, from the developer terminal 80 operated by the developer u50. The management server 30 issues identification information d22 to the developer u50 indicated by the developer name d20.

The management server 30 generates, based on the obtained API list, the access control information d30 for controlling (permitting) access to APIs on the list. Note that the content of the access control information d30 will be described below along with a specific configuration for generating the access control information d30.

The management server 30 stores previously generated key information k10, and based on the key information k10, encodes the developer name d20, the identification information d22, and the access control information d30 to generate encoded information d32.

The management server 30 transmits the issued identification information d22 and the generated access control information d30 and encoded information d32 to the developer terminal 80 of the developer u50. Thus, the advance request of the developer u50 has been completed for development of the application d10 using one or more of the APIs 50 for which authorization for use has been requested.

Note that, in the information processing system of this embodiment, the developer u50, when employing APIs for which authorization for use in the application d10 to be developed has been requested, embeds the developer name d20, the identification information d22, the access control information d30, and the encoded information d32 in the application d10. Note that, in the description that follows, the developer name d20 and the identification information d22 may be collectively referred to as "developer identification information." The developer identification information, the access control information d30, and the encoded information d32 may be collectively referred to as "authentication information." With such a configuration, the information processing device 10, when executing the application d10, obtains the authentication information embedded in the application d10, and based on the obtained authentication information, can determine whether or not the developer u50 has been authorized to use APIs. Note that the operation of the information processing device 10 to determine the presence or absence of authorization to use APIs based on the authentication information will be described in detail below.

Note that the rule of embedding of the authentication information in the application d10 may be made based on an operation of APIs. As a specific example, for one or more of the APIs 50 for which it is necessary to request authorization for use, a process may be defined so that when the application d10 is executed, then if the authentication information embedded in the application d10 is not presented, a limitation on use is not cancelled.

Note that the developer u50 publishes the application d10 having the embedded authentication information, for example, on the application providing server 90. As a result, the user u20 can download the application d10 developed by the developer u50 from the application providing server 90 and installs the application d10 into their own user terminal 20.

Next, an operation will be described which is performed when the user terminal 20 accesses the information processing device 10 via the network n1 by execution of the application d10 installed in the user terminal 20.

The information processing device 10 of this embodiment, when receiving access from the user terminal 20 during execution of the application d10, obtains the authentication information embedded in the application d10 from the user terminal 20.

At this time, the user terminal 20 transmits the developer identification information and the access control information d30 of the authentication information to the information processing device 10 without performing an irreversible process thereon. The user terminal 20 may transmit at least the developer identification information of the authentication information to the information processing device 10 without performing an encryption process or an encoding process thereon. Note that, here, the encryption process and the encoding process refer to an encryption process and an encoding process for protection of data, but not to an encryption process and an encoding process for communication based on a predetermined communication scheme.

The user terminal 20 may further encode the encoded information d32 included in the authentication information before transmitting it to the information processing device 10. In this case, the user terminal 20 may obtain key information (e.g., a random number) for encoding the encoded information d32 from the information processing device 10. Note that a process of encoding the encoded information d32 which is performed by the user terminal 20 will be described in detail below.

The information processing device 10 determines, based on the authentication information obtained from the user terminal 20, whether or not the developer u50 indicated by the developer identification information included in the authentication information is a developer who has requested authorization to use APIs.

As a specific example, the information processing device 10 may encode the developer name d20, the identification information d22, and the access control information d30 obtained from the user terminal 20 to generate encoded information d42, and based on the encoded information d42, identify the developer u50.

In this case, the information processing device 10 previously obtains and stores the key information k10 stored in the management server 30. The information processing device 10 encodes the developer identification information and the access control information d30 obtained from the user terminal 20 based on the key information k10 to generate the encoded information d42. Thereafter, the information processing device 10 may compare the generated encoded information d42 with the obtained encoded information d32, and based on whether or not the generated encoded information d42 and the obtained encoded information d32 match, determine whether or not the developer u50 indicated by the developer identification information is a developer who has requested authorization to use APIs.

Note that the above determination technique is only for illustrative purposes. Any determination technique may be used that allows the information processing device 10 to determine, based on the obtained authentication information, whether or not the developer u50 indicated by the developer identification information is a developer who has requested authorization to use APIs.

After it has been confirmed that the developer u50 is a developer who has requested authorization to use APIs, the information processing device 10 recognizes APIs for which authorization for use has been requested, based on the access control information d30 included in the authentication information. Thereafter, the information processing device 10 controls its own execution of APIs which are called during execution of the application d10, depending on whether or not the APIs are among those which can be recognized based on the access control information d30.

Figure 3:
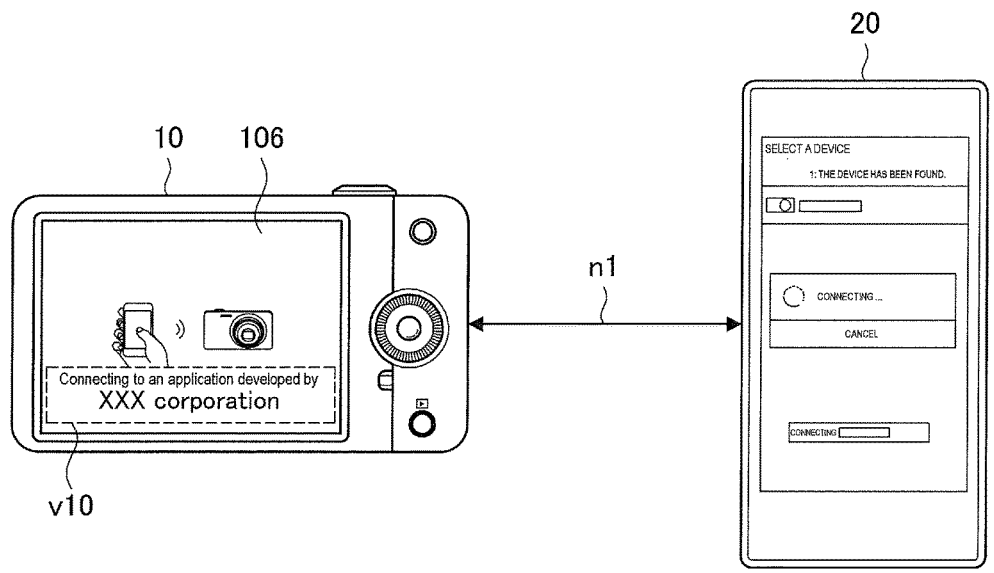
FIG. 3 is a diagram for describing an example application of the information processing system of the embodiment.

If it has been confirmed that the developer u50 is a developer who has requested authorization to use APIs, the information processing device 10 may cause, for example, a display unit to identifiably display the developer u50 indicated by the developer identification information. For example, FIG. 3 is a diagram for describing an example application of the information processing system of this embodiment, showing a case where information indicating the developer of the application d10 is displayed when connection between the information processing device 10 and the user terminal 20 is established. As shown in FIG. 3, the information processing device 10 causes a display unit 106 (e.g., a display) to display developer information v10 which identifiably presents the developer u50 indicated by the developer identification information.

Note that it is assumed that the developer u50 has embedded, in the application d10, authentication information in which the developer u50 pretends to be another developer who has made an advance request for authorization for use, without making an advance request for authorization for use. In this case, a developer indicated on a download site etc. when the application d10 is provided, and a developer displayed during execution of the application d10, do not match. For example, FIG. 4 is a diagram for describing an example application of the information processing system of this embodiment, showing an example download site v90.

Figure 4:
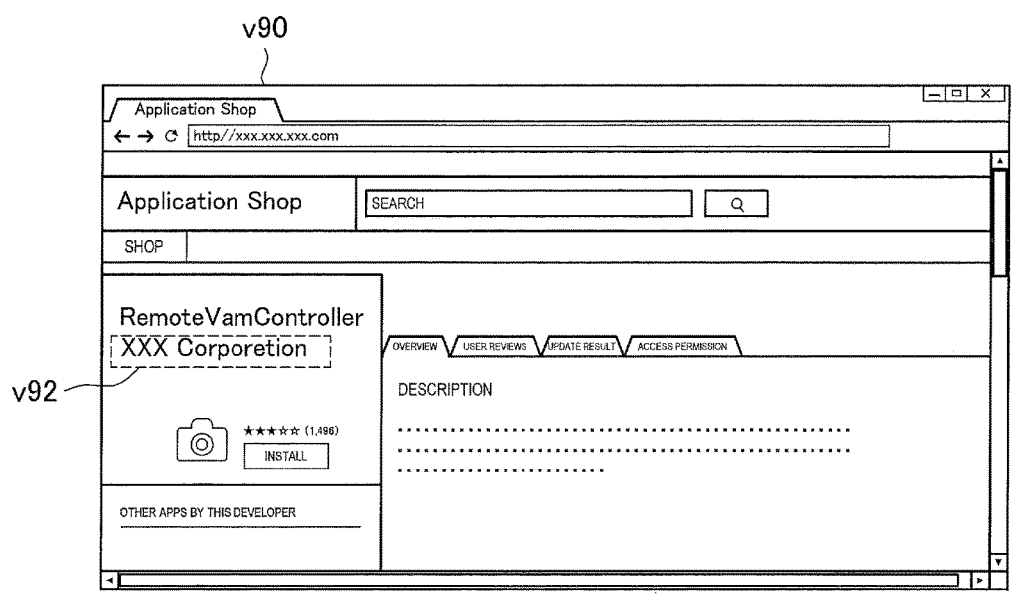
FIG. 4 is a diagram for describing an example application of the information processing system of the embodiment.

As shown in FIG. 4, on the download site v90, developer information v92 indicating development of the application d10 is displayed as information about the application d10 to be provided. As described above, if, in the authentication information, the developer u50 pretends to be another developer who has made an advance request for authorization for use, the developer information v10 displayed on the display unit 106 of FIG. 3 and the developer information v92 presented on the download site v90 of FIG. 4 do not match. Note that when a portable medium is used for installing, the authentic developer can, for example, be verified based on a description on the package of the portable medium or information published on a web site etc.

Also, during execution of the application d10, the developer identification information is transmitted to the information processing device 10 without being encrypted or encoded. Therefore, the developer identification information is exposed on the network n1 between the user terminal 20 and the information processing device 10.

As described above, in the information processing system of this embodiment, during execution of the application d10, the developer identification information embedded in the application d10 is presented on the user terminal 20. As a result, even if APIs are used without authorization, by a developer who pretends to be another developer who is authorized, a user who uses the application d10 can be caused to find that the developer pretends to be another developer who is authorized. If a user who uses the application d10 thus detects that the developer pretends to be another developer who is authorized, the user finds the unauthorized use by the developer, and concomitantly, the unauthorized use of APIs by a developer who pretends to be another developer who is authorized can be deterred.

Note that the timing at which the information processing device 10 causes the display unit 106 to display the developer information v10 is not particularly limited. As a specific example, the information processing device 10 may cause the display unit 106 to display the developer information v10 when the operation is being controlled based on the application d10 executed in the user terminal 20.

Figure 5:
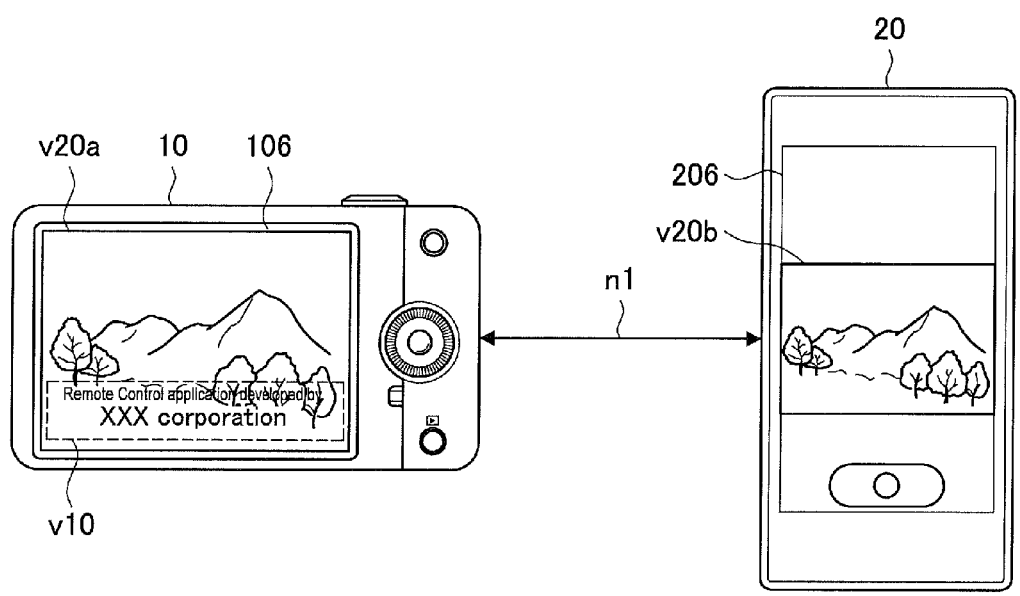
FIG. 5 is a diagram for describing an example application of the information processing system of the embodiment.

For example, FIG. 5 is a diagram for describing an example application of the information processing system of this embodiment, showing an example in which a digital camera is used as the information processing device 10, and image capture by the digital camera is controlled based on an operation from the user terminal 20. In the example of FIG. 5, as a result of image capture by the digital camera, a captured image v20a is displayed on the display unit 106, and the image v20a is transferred to the user terminal 20 and displayed as an image v20b on a display unit 206 of the user terminal 20. At this time, the digital camera may display the developer information v10 together with the image v20a displayed on the display unit 106. Thus, by displaying the developer information v10 when the application d10 is operating, the user u20 can be caused to be more conscious of a relationship between the operating application d10 and the developer indicated by the developer information v10.

3. Configuration

Figure 6:
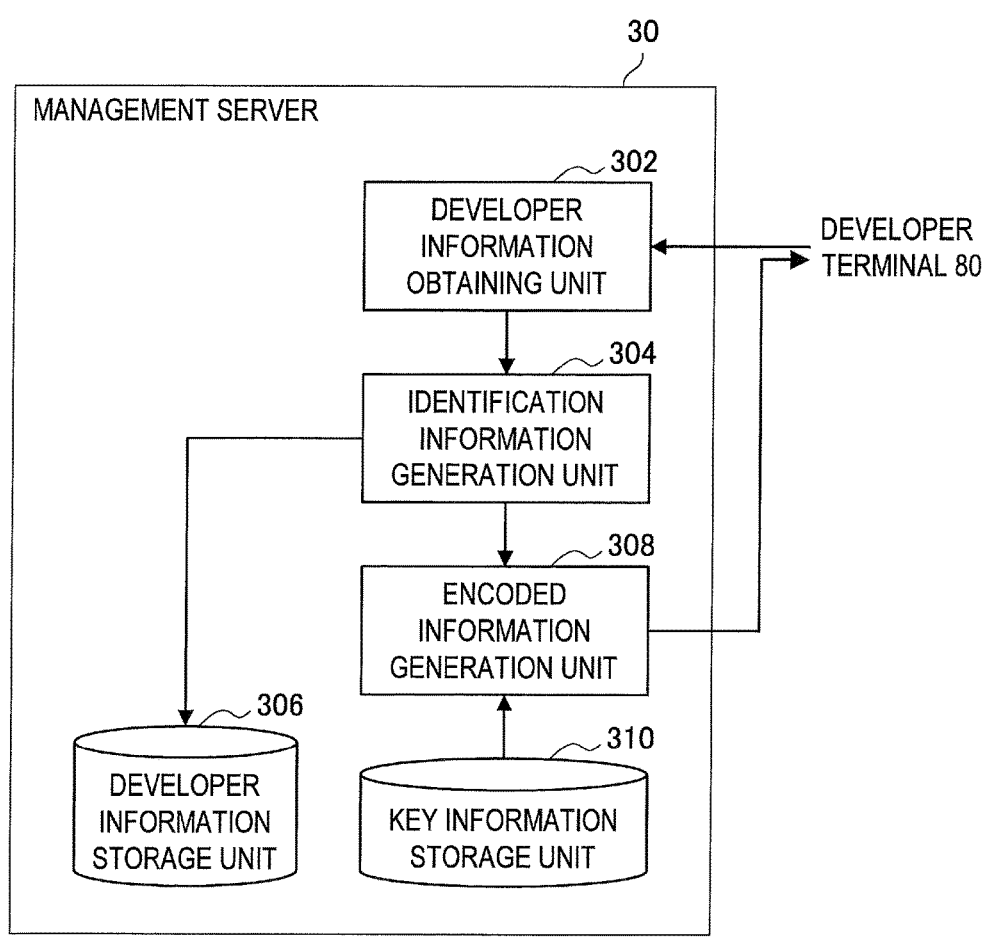
FIG. 6 is a block diagram showing an example configuration of a management server according to the embodiment.

Next, configurations of the information processing device 10, the user terminal 20, and the management server 30 will be described in detail. Firstly, a configuration of the management server 30 will be described with reference to FIG. 6. FIG. 6 is a block diagram showing an example configuration of the management server 30 of this embodiment.

(Management Server 30)

As shown in FIG. 6, the management server 30 includes a developer information obtaining unit 302, an identification information generation unit 304, a developer information storage unit 306, an encoded information generation unit 308, and a key information storage unit 310.

The developer information obtaining unit 302 obtains the developer name d20 of the developer u50 which is specified by the developer u50, and a list of one or more of the APIs 50 which are used, from the developer terminal 80 operated by the developer u50.

Note that the technique by which the developer information obtaining unit 302 obtains the developer name d20 and the API list is not particularly limited. For example, the developer information obtaining unit 302 may obtain the developer name d20 and the API list from the developer terminal 80 using a mail.

As another example, the developer information obtaining unit 302 may generate a screen for specifying the developer name d20 and the API list. In this case, for example, the developer u50 may operate the developer terminal 80 to access the management server 30, and operate the screen presented by the developer information obtaining unit 302 to specify the developer name d20 and the API list.

The developer information obtaining unit 302 outputs the obtained developer name d20 and API list to the identification information generation unit 304.

The identification information generation unit 304 obtains the developer name d20 and the API list from the developer information obtaining unit 302. The identification information generation unit 304 issues the identification information d22 to the developer u50 indicated by the developer name d20.

The identification information generation unit 304 generates, based on the obtained API list, the access control information d30 for controlling (permitting) access to APIs on the list.

The access control information d30 may be, for example, a list of the names of APIs which a developer has been authorized to use, or a list of identification information (e.g., numbers indicating APIs) indicating the names of APIs. The content of the access control information may be changed in API management units as appropriate. For example, when APIs are managed in packages, the access control information d30 may be a list of the names of packages which a developer has been authorized to use. When developers may be divided into predetermined categories, and available APIs are designated for each developer category, the access control information d30 may be information indicating a developer category. Thus, the access control information d30 may be in any form that allows APIs which a developer has been authorized to use to be identifiable.

The identification information generation unit 304 stores the obtained developer name d20, the issued identification information d22, and the generated access control information d30 as developer information in the developer information storage unit 306 in association with each other. Note that when receiving a request for registration of APIs which are newly used, from the developer u50 for which the developer information has already been registered, the identification information generation unit 304 may operate to update the developer information of the developer u50 stored in the developer information storage unit 306.

The identification information generation unit 304 outputs the obtained developer name d20, the issued identification information d22, and the generated access control information d30 to the encoded information generation unit 308.

The encoded information generation unit 308 obtains the developer name d20, the identification information d22, and the access control information d30 from the identification information generation unit 304.

The encoded information generation unit 308 encodes the developer name d20, the identification information d22, and the access control information d30 based on the previously generated key information k10 to generate the encoded information d32. Note that the key information k10 is stored in the key information storage unit 310.

At this time, the encoded information generation unit 308 may employ an irreversible encoding technique as the encoding technique. Note that any encoding technique based on key information may be employed to generate the encoded information d32. An example encoding technique for generating the encoded information d32 is keyed hashing.

The encoded information generation unit 308 transmits the identification information d22, the access control information d30, and the encoded information d32 to the developer terminal 80 of the developer u50. As a result, the developer u50 is notified of information based on which the developer u50 develops the application d10 using APIs for which authorization for use has been requested by the developer u50, i.e., the identification information d22, the access control information d30, and the encoded information d32.

Thus, the advance request has been completed which allows the developer u50 to generate the application d10 using one or more of the APIs 50 for which authorization for use has been requested by the developer u50. Note that, in order to allow the application d10 to use the APIs 50 included in the information processing device 10, it is not necessary that the information processing device 10 be notified of the developer identification information, the access control information d30, and the encoded information d32. Therefore, for example, the developer identification information, the access control information d30, and the encoded information d32 which the developer u50 has been notified of by the management server 30 are embedded in the application d10 developed by the developer u50. Note that if the information processing device 10 is notified of the developer identification information, the access control information d30, and the encoded information d32, these items of information may not necessarily have to be embedded in the application d10.

(Information Processing Device 10 and User Terminal 20)

Figure 7:
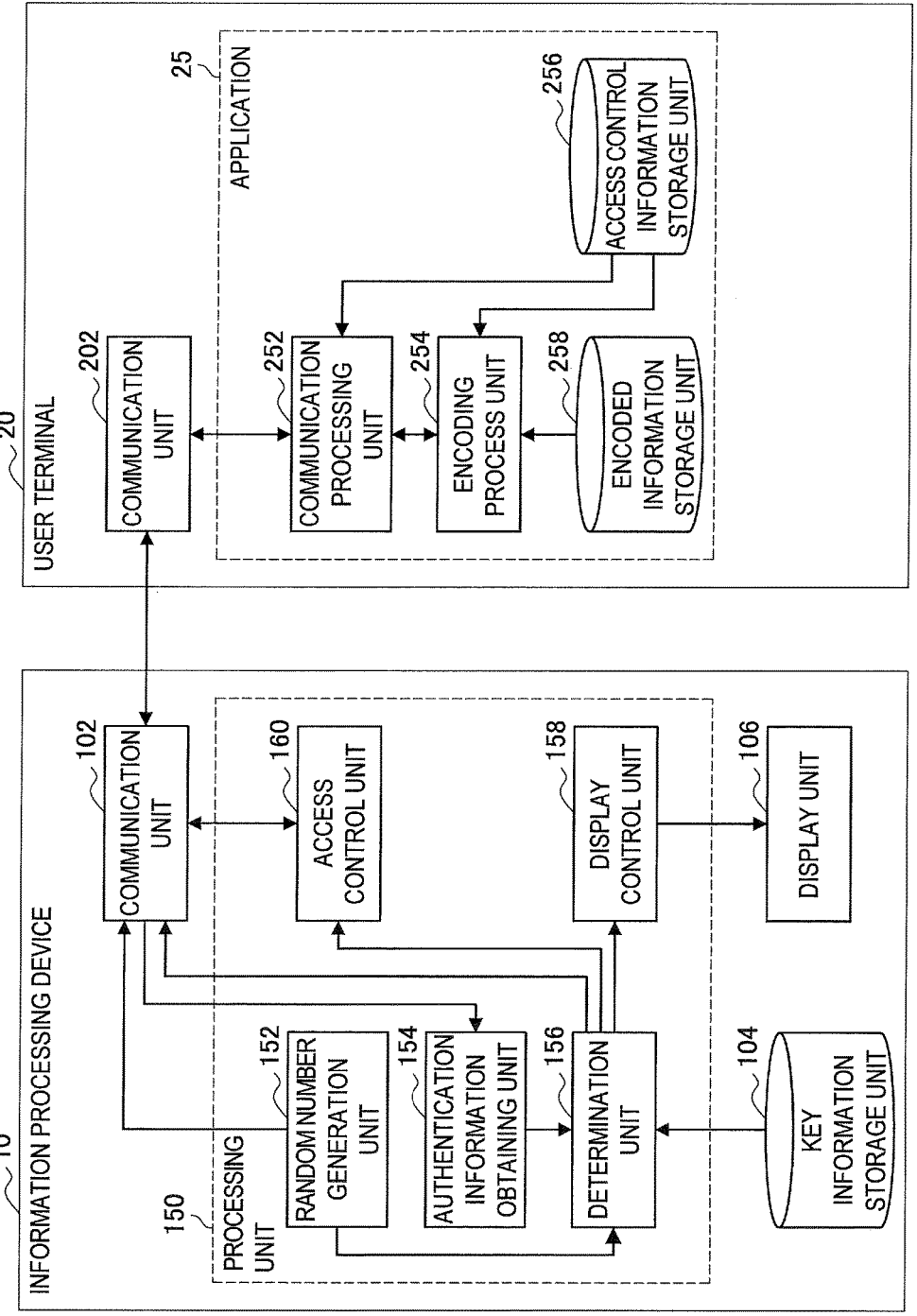
FIG. 7 is a block diagram showing example configurations of an information processing device and a user terminal according to the embodiment.

Next, configurations of the information processing device 10 and the user terminal 20 will be described with reference to FIG. 7. FIG. 7 is a block diagram showing example configurations of the information processing device 10 and the user terminal 20 of this embodiment. Note that it is assumed that the application d10 developed by the developer u50 has been installed in the user terminal 20.

Firstly, the user terminal 20 will be described. As shown in FIG. 7, the user terminal 20 includes a communication unit 202 for communicating with the information processing device 10. An application 25 has been installed in the user terminal 20. Note that the application 25 schematically illustrates a function which is achieved by executing the above application d10 for controlling an operation of the information processing device 10. The application 25 includes a communication processing unit 252, an encoding process unit 254, an access control information storage unit 256, and an encoded information storage unit 258.

The communication unit 202 is an interface for communicating with the information processing device 10. The communication unit 202 may be, for example, a device for establishing wireless communication, such as Wi-Fi etc., between the user terminal 20 and the information processing device 10. Note that the communication unit 202 may be in any form that allows any communication including wireless communication to be established between the user terminal 20 and the information processing device 10. The user terminal 20 exchanges data with the information processing device 10 via the communication unit 202. Note that, in the description that follows, when each component of the user terminal 20 exchanges data with components of the information processing device 10, data is exchanged via the communication unit 202 even when not explicitly recited.

The access control information storage unit 256 is a storage unit which stores the developer identification information (i.e., the developer name d20 and the identification information d22) and the access control information d30.

The encoded information storage unit 258 is a storage unit which stores the encoded information d32.

The communication processing unit 252 obtains and transmits data from and to the information processing device 10. A specific operation of the communication processing unit 252 will now be described.

When the application d10 is launched, the communication processing unit 252 requests the information processing device 10 to generate key information for encoding, and obtains key information k20 as a response from the information processing device 10. Note that the key information k20 will be described in detail below along with a configuration of the information processing device 10.

When receiving the key information k20 from the information processing device 10, the communication processing unit 252 outputs the obtained key information k20 to the encoding process unit 254. The communication processing unit 252 obtains, from the encoding process unit 254, encoded information d52 as a response to the output of the key information k20. The encoded information d52 is information which is obtained by encoding the encoded information d32 based on the key information k20. Note that a process involved in generating the encoded information d52 will be described below along with an operation of the encoding process unit 254.

The communication processing unit 252 reads the developer identification information and the access control information d30 from the access control information storage unit 256. The communication processing unit 252 transmits the obtained encoded information d52, and the developer identification information and the access control information d30 read from the access control information storage unit 256, as authentication information, to the information processing device 10.

At this time, the communication processing unit 252 transmits, to the information processing device 10, the developer identification information and the access control information d30 of the authentication information without performing an irreversible process thereon. The communication processing unit 252 may transmit, to the information processing device 10, at least the developer identification information of the authentication information without performing an encryption process or an encoding process thereon. Note that, here, the encryption process and the encoding process refer to an encryption process and an encoding process for protection of data, but not to an encryption process and an encoding process for communication based on a predetermined communication scheme.

The encoding process unit 254 obtains the key information k20 from the communication processing unit 252. When obtaining the key information k20, the encoding process unit 254 reads the encoded information d32 from the encoded information storage unit 258. The encoding process unit 254 encodes the read encoded information d32 based on the obtained key information k20 to generate the encoded information d52.

At this time, the encoding process unit 254 employs an irreversible encoding technique as the encoding technique. Note that any irreversible encoding technique based on key information may be employed to generate the encoded information d52. An example encoding technique for generating the encoded information d52 is keyed hashing.

The encoding process unit 254 outputs the generated encoded information d52 to the communication processing unit 252.

Next, a configuration of the information processing device 10 will be described. As shown in FIG. 7, the information processing device 10 includes a communication unit 102, a key information storage unit 104, a display unit 106, and a processing unit 150. The processing unit 150 includes a random number generation unit 152, an authentication information obtaining unit 154, a determination unit 156, a display control unit 158, and an access control unit 160.

The communication unit 102 is an interface for communicating with the user terminal 20. Note that the communication unit 102 has a configuration similar to that of the communication unit 202 described above and therefore will not be described in detail. Note that, in the description that follows, when each component of the information processing device 10 exchanges data with components of the user terminal 20, data is exchanged via the communication unit 102 even when not explicitly recited.

The key information storage unit 104 is a storage unit which stores the key information k10. The key information storage unit 104 stores the key information k10 similar to the above key information which is stored in the key information storage unit 310 of the management server 30.

The random number generation unit 152, when receiving a request for generation of key information from the user terminal 20, generates the key information k20 for encoding. A specific example of the key information k20 is information which is randomly generated, such as a random number. Note that the key information k20 is not limited to a random number and may be in any form that can provide the functionality of a key for performing an encoding process.

The random number generation unit 152 transmits the generated key information k20 to the user terminal 20. As a result, the user terminal 20 can encode the encoded information d32 based on the key information k20 to generate the encoded information d52.

The random number generation unit 152 outputs the generated key information k20 to the determination unit 156.

The authentication information obtaining unit 154 obtains the developer identification information, the access control information d30, and the encoded information d52 as authentication information from the information processing device 10. The authentication information obtaining unit 154 outputs the obtained authentication information to the determination unit 156.

The determination unit 156 obtains the authentication information transmitted from the user terminal 20, and based on the obtained authentication information, determines whether or not a developer indicated by the developer identification information included in the authentication information is a developer who has made an advance request for authorization for use. Note that a developer indicated by the developer identification information indicates the developer of the application d10 executed in the user terminal 20. An example determination process performed by the determination unit 156 will now be described.

The determination unit 156 obtains the key information k20 from the random number generation unit 152. The determination unit 156 also obtains the authentication information from the authentication information obtaining unit 154. The determination unit 156 also reads the key information k10 from the key information storage unit 310.

The determination unit 156 encodes the developer identification information and the access control information d30 included in the obtained authentication information based on the key information k10 to generate the encoded information d42. Note that, at this time, the determination unit 156 generates the encoded information d42 based on an encoding process similar to that of the encoded information generation unit 308 of the management server 30. Specifically, when the encoded information d32 which is a generation source of the encoded information d52 has been generated by the encoded information generation unit 308 based on the developer identification information and the access control information d30 included in the authentication information, the encoded information d32 and d42 match.

After generating the encoded information d42, the determination unit 156 encodes the generated encoded information d42 based on the key information k20 to generate encoded information d62. Note that, at this time, the determination unit 156 generates the encoded information d62 based on an encoding process similar to that of the encoding process unit 254 of the user terminal 20.

The determination unit 156 compares the generated encoded information d62 with the obtained encoded information d52, and when the information d62 and d52 match, recognizes a developer indicated by the developer identification information as a developer who has made an advance request for authorization for use. Note that, at this time, when the encoded information d32 and d42 match, the encoded information d52 and d62 encoded by a similar encoding process based on similar key information k20 match.

Note that the above process of the determination unit 156 is only for illustrative purposes. The operation of the determination unit 156 is not limited, if it can be determined based on the obtained authentication information whether or not a developer indicated by the developer identification information included in the authentication information is a developer who has made an advance request for authorization for use. For example, if the determination unit 156 can communicate with the management server 30 via an external network, such as the Internet, the determination unit 156 may inquire of the management server 30, via the external network, whether the developer identification information included in the obtained authentication information is correct.

Although an example has been described above in which the encoded information d32 is encoded based on the key information k20 before being transmitted from the user terminal 20 to the information processing device 10, the encoded information d32 may be transmitted from the user terminal 20 to the information processing device 10 without being encoded based on the key information k20. In this case, needless to say, none of the processes involved in the generation and transmission of the key information k20 and the process of encoding the encoded information d32 based on the key information k20 is necessary. The information processing device 10 may obtain the encoded information d32 from the user terminal 20, and determine whether or not the obtained encoded information d32 match the encoded information d42 generated based on the key information k10.

When recognizing a developer indicated by the developer identification information as a developer who has made an advance request for authorization for use, the determination unit 156 outputs the access control information d30 to the access control unit 160. The determination unit 156 may also notify the user terminal 20 that the developer indicated by the developer identification information has been determined to be a developer who has made an advance request for authorization for use. When receiving the notification, the user terminal 20 may call APIs for which an advance request for authorization for use has been made.

The determination unit 156 may also output information indicating the developer indicated by the developer identification information, e.g., at least one of the developer name d20 and the identification information d22, to the display control unit 158. Note that, in the description that follows, it is assumed that the determination unit 156 outputs both the developer name d20 and the identification information d22 to the display control unit 158.

The access control unit 160 obtains the access control information d30 from the determination unit 156. The access control unit 160, when an execution unit (not shown) of the user terminal 20 executes the application d10 to call APIs, permits or limits execution of the APIs based on the access control information d30.

As a specific example, if there is not a particular limitation on the use of the called APIs, and it is not necessary to have made an advance request for authorization to use the called APIs, the access control unit 160 permits execution of the APIs. When the execution of the APIs is permitted, the APIs are executed by an execution unit (not shown) of the information processing device 10.

When there is a limitation on the use of the called APIs, and the use of the APIs is permitted based on the access control information d30, the access control unit 160 permits execution of the APIs.

On the other hand, when there is a limitation on the use of the called APIs and the use of the APIs is not permitted based on the access control information d30, the access control unit 160 limits or forbids execution of the APIs. At this time, the access control unit 160 may notify the user terminal 20 that execution of the called APIs is not permitted.

Thus, the access control unit 160 controls execution of each of the APIs 50 based on the access control information d30.

The display control unit 158 obtains the developer name d20 and the identification information d22 from the determination unit 156. The display control unit 158 causes the display unit 106 to identifiably display the obtained developer name d20 and identification information d22, i.e., information indicating the developer of the executed application d10. The display unit 106 is a display medium, such as a display etc. As a specific example, when the information processing device 10 is a digital camera, the display unit 106 may be a display etc. which is provided in order to check information or see a captured image.

Thus, by identifiably displaying information indicating the developer of the executed application d10, for example, when APIs are used without authorization, by a developer who pretends to be another developer who is authorized, this unauthorized use can be detected.

Specifically, when a developer pretends to be another developer who is authorized, information displayed on the display unit 106 does not match a developer which is displayed on a download site etc. when the corresponding application is obtained. Therefore, by identifiably displaying the obtained information indicating a developer during execution of an application, if the developer pretends to be another developer who is authorized, it can be suggested to the user u20 using the information processing device 10 that the developer pretends to be another developer who is authorized.

Note that when information indicating a developer is identifiably displayed, the displaying itself of the information indicating a developer can also deter the unauthorized use of APIs by a developer who pretends to be another developer who is authorized. Therefore, when information indicating a developer is identifiably displayed, a reversible encryption process or encoding process may be performed on the developer name d20 or the identification information d22 before being transmitted from the user terminal 20 to the information processing device 10. In this case, the determination unit 156 may decode the developer name d20 or the identification information d22 which has been encrypted or encoded, and based on the decoded developer name d20 or identification information d22, execute the above determination process.

Although an example in which available APIs are limited for each developer has been described above, the management units in which the use of APIs is limited may be changed, depending on actual operation, as appropriate. For example, when available APIs are limited for each application, different pieces of access control information d30 may be issued for different applications. In this case, the access control information d30 issued for each application may be managed in association with a single piece of identification information d22, or different pieces of identification information d22 may be issued for each piece of access control information d30. Note that when different pieces of access control information d30 are issued, there are different pieces of encoded information d32 which are generated based on the respective corresponding pieces of access control information d30, and therefore, the control of access to APIs can be changed on an application-by-application basis.

4. Process

Next, a flow of a process of the information processing system of this embodiment will be described, particularly including an operation involved in making an advance request for authorization to use the APIs 50 by the developer u50, and an operation of the information processing device 10 to control the use of the APIs 50 based on information from the user terminal 20.

[Operation Involved in Making Advance Request for Authorization for Use]

Firstly, a flow of a process of the management server 30 which is performed when the developer u50 makes an advance request for authorization to use the APIs 50 from the management server 30 will be described with reference to FIG. 8. FIG. 8 is a sequence diagram showing a series of operations of the management server 30 of this embodiment.

(Step S102)

The developer information obtaining unit 302 obtains the developer name d20 of the developer u50 specified by the developer u50, and a list of one or more of the APIs 50 which are used by the developer u50, from the developer terminal 80 operated by the developer u50.

The developer information obtaining unit 302 outputs the obtained developer name d20 and API list to the identification information generation unit 304.

(Step S104)

The identification information generation unit 304 obtains the developer name d20 and the API list from the developer information obtaining unit 302. The identification information generation unit 304 issues the identification information d22 to the developer u50 indicated by the developer name d20.

The identification information generation unit 304 also generates, based on the obtained API list, the access control information d30 for controlling (permitting) access to APIs on the list.

The identification information generation unit 304 outputs the obtained developer name d20, the issued identification information d22, and the generated access control information d30 to the encoded information generation unit 308.

(Step S106)

The encoded information generation unit 308 obtains the developer name d20, the identification information d22, and the access control information d30 from the identification information generation unit 304.

The encoded information generation unit 308 encodes the developer name d20, the identification information d22, and the access control information d30 based on the previously generated key information k10 to generate the encoded information d32. Note that the key information k10 is stored in the key information storage unit 310.

At this time, the encoded information generation unit 308 employs an irreversible encoding technique as the encoding technique. Note that any irreversible encoding technique based on key information may be employed to generate the encoded information d32. An example encoding technique for generating the encoded information d32 is keyed hashing.

(Step S108)

The encoded information generation unit 308 transmits the identification information d22, the access control information d30, and the encoded information d32 to the developer terminal 80 of the developer u50. As a result, the developer u50 is notified of information based on which the developer u50 develops the application d10 using APIs for which authorization for use has been requested by the developer u50, i.e., the identification information d22, the access control information d30, and the encoded information d32.

[Operation Involved in Controlling Use of API]

Next, a flow of a process which is performed by the information processing device 10 and the user terminal 20 when the information processing device 10 receives an instruction from the user terminal 20, and then confirms authorization to use the APIs 50 and performs a control of access to the APIs 50, will be described with reference to FIG. 9. FIG. 9 is a sequence diagram showing a series of operations of the information processing device 10 of this embodiment.

(Step S202)

When the application d10 is launched, the communication processing unit 252 requests the information processing device 10 to generate key information for encoding.

The random number generation unit 152, when receiving a request for generation of key information from the user terminal 20, generates the key information k20 for encoding. A specific example of the key information k20 is information which is randomly generated, such as a random number. Note that the key information k20 is not limited to a random number and may be in any form that can provide the functionality of a key for performing an encoding process.

(Step S204)

The random number generation unit 152 transmits the generated key information k20 to the user terminal 20. The random number generation unit 152 also outputs the generated key information k20 to the determination unit 156.

When receiving the key information k20 from the information processing device 10, the communication processing unit 252 outputs the obtained key information k20 to the encoding process unit 254.

(Step S206)

The encoding process unit 254 obtains the key information k20 from the communication processing unit 252. When obtaining the key information k20, the encoding process unit 254 reads the encoded information d32 from the encoded information storage unit 258. The encoding process unit 254 encodes the read encoded information d32 based on the obtained key information k20 to generate the encoded information d52.

At this time, the encoding process unit 254 employs an irreversible encoding technique as the encoding technique. Note that any irreversible encoding technique based on key information may be employed to generate the encoded information d52. An example encoding technique for generating the encoded information d52 is keyed hashing.

The encoding process unit 254 outputs the generated encoded information d52 to the communication processing unit 252. The communication processing unit 252 obtains the encoded information d52 from the encoding process unit 254 as a response from the output of the key information k20.

(Step S208)

The communication processing unit 252 reads the developer identification information (i.e., the developer name d20 and the identification information d22) and the access control information d30 from the access control information storage unit 256. The communication processing unit 252 transmits the obtained encoded information d52, and the developer identification information and the access control information d30 read from the access control information storage unit 256, as authentication information, to the information processing device 10.

At this time, the communication processing unit 252 transmits, to the information processing device 10, the developer identification information and the access control information d30 of the authentication information without performing an irreversible process thereon. The communication processing unit 252 may transmit, to the information processing device 10, at least the developer identification information of the authentication information without performing an encryption process or an encoding process thereon.

(Step S210)

The authentication information obtaining unit 154 obtains the developer identification information, the access control information d30, and the encoded information d52 as authentication information from the information processing device 10. The authentication information obtaining unit 154 outputs the obtained authentication information to the determination unit 156.

The determination unit 156 obtains the key information k20 from the random number generation unit 152. The determination unit 156 also obtains the authentication information from the authentication information obtaining unit 154. The determination unit 156 also reads the key information k10 from the key information storage unit 310.

The determination unit 156 encodes the developer identification information and the access control information d30 included in the obtained authentication information based on the key information k10 to generate the encoded information d42. Note that, at this time, the determination unit 156 generates the encoded information d42 based on an encoding process similar to that of the encoded information generation unit 308 of the management server 30.

After generating the encoded information d42, the determination unit 156 encodes the generated encoded information d42 based on the key information k20 to generate encoded information d62. Note that, at this time, the determination unit 156 generates the encoded information d62 based on an encoding process similar to that of the encoding process unit 254 of the user terminal 20.

The determination unit 156 compares the generated encoded information d62 with the obtained encoded information d52, and when the information d62 and d52 match, recognizes a developer indicated by the developer identification information as a developer who has made an advance request for authorization for use.

(Step S212)

When recognizing the developer indicated by the developer identification information as a developer who has made an advance request for authorization for use, the determination unit 156 outputs the access control information d30 to the access control unit 160. Note that when not recognizing the developer indicated by the developer identification information as a developer who has made an advance request for authorization for use, the determination unit 156 may deny access from the user terminal 20. In this case, the user terminal 20 may receive notification of the denial of access from the determination unit 156, and end the application d10. Alternatively, for example, the determination unit 156, when not recognizing the developer indicated by the developer identification information as a developer who has made an advance request for authorization for use, may output, to the access control unit 160, access control information indicating permission of access only to an API(s) for which an advance request for authorization for use is not necessary.

The determination unit 156 may output information indicating a developer indicated by the developer identification information, e.g., at least one of the developer name d20 and the identification information d22, to the display control unit 158. Note that, in the description that follows, it is assumed that the determination unit 156 outputs both the developer name d20 and the identification information d22 to the display control unit 158.

The display control unit 158 obtains the developer name d20 and the identification information d22 from the determination unit 156. The display control unit 158 causes the display unit 106 to identifiably display the obtained developer name d20 and identification information d22, i.e., information indicating the developer of the executed application d10.

(Step S214)

The determination unit 156 may also notify the user terminal 20 that a developer indicated by the developer identification information has been determined to be a developer who has made an advance request for authorization for use. When receiving the notification, the user terminal 20 may call APIs for which an advance request for authorization for use has been made.

(Steps S216 and S218)

The access control unit 160 obtains the access control information d30 from the determination unit 156. The access control unit 160, when an execution unit (not shown) of the user terminal 20 executes the application d10 to call APIs (step S216), permits or limits execution of the APIs based on the access control information d30 (step S218).

As a specific example, if there is not a particular limitation on the use of the called APIs, and it is not necessary to have made an advance request for authorization to use the APIs, the access control unit 160 permits execution of the APIs. When the execution of the APIs is permitted, the APIs are executed by an execution unit (not shown) of the information processing device 10.

When there is a limitation on the use of the called APIs, and the use of the APIs is permitted based on the access control information d30, the access control unit 160 permits execution of the APIs.

On the other hand, when there is a limitation on the use of the called APIs and the use of the APIs is not permitted based on the access control information d30, the access control unit 160 limits or forbids execution of the APIs. At this time, the access control unit 160 may notify the user terminal 20 that execution of the called APIs is not permitted.

Thus, the access control unit 160 controls execution of each of the APIs 50 based on the access control information d30.

5. Hardware Configuration

An embodiment of the present disclosure has been described above. The above information process performed by the information processing device 10 is achieved by cooperation with the following hardware of the information processing device 10.

FIG. 10 is an explanatory diagram showing an example hardware configuration of the information processing device 10. As shown in FIG. 10, the information processing device 10 includes a central processing unit (CPU) 901, a read only memory (ROM) 902, a random access memory (RAM) 903, an input device 908, an output device 910, a storage device 911, a drive 912, and a communication device 915.

The CPU 901 functions as a calculation processing device and a control device to control the overall operation of the information processing device 10 according to various programs. The CPU 901 may be a microprocessor. The ROM 902 stores programs, calculation parameters, etc. which are used by the CPU 901. The RAM 903 temporarily stores programs used in execution by the CPU 901, parameters changed when necessary during the execution, etc. These components are connected together by a host bus including a CPU bus etc.

The input device 908 includes an input unit for allowing the user to input information, such as a button, a switch etc., an input control circuit which generates an input signal based on the user's input and outputs the input signal to the CPU 901, etc. The user of the information processing device 10 can instruct the information processing device 10 to perform a process by operating the input device 908.

The output device 910 includes, for example, a display device, such as a liquid crystal display (LCD) device, an organic light emitting diode (OLED) device, a lamp, etc. The output device 910 also includes an audio output device, such as a loudspeaker, a headphone, etc. For example, the display device displays a captured image, a generated image, etc. On the other hand, the audio output device converts audio data etc. into sound, and outputs the sound.

The storage device 911 is a device for storing data which is configured as an example storage unit of the information processing device 10 of this embodiment. The storage device 911 may include a storage medium, a recording device which records data to the storage medium, a reading device which reads data from the storage medium, an erasure device which erases data from the storage medium, etc. The storage device 911 stores programs executed by the CPU 901 and various items of data.

The drive 912 is a reader/writer for a storage medium, and is internal or external to the information processing device 10. The drive 912 reads information from a removable storage medium mounted therein, such as a magnetic disk, an optical disk, a magneto-optical disk, a semiconductor memory, etc., and outputs the information to the RAM 903. The drive 912 can also write information to a removable storage medium.

The communication device 915 is, for example, a communication interface including a communication device for connecting to a network N, etc. In particular, the communication device 915 of the embodiment of the present disclosure includes a wireless (local area network) LAN-compliant communication device. Note that the communication device 915 may include a long term evolution (LTE)-compliant communication device, or a wired communication device which performs communication via a wire.

Note that the network N is a wired or wireless transmission channel for information transmitted from a device connected to the network N. For example, the network N may include a public network such as the Internet, a telephone network, a satellite communication network, etc., various local area networks (LANs) such as Ethernet (registered trademark) etc., various wide area networks (WANs), etc. The network N may also include a dedicated network such as the Internet protocol-virtual private network (IP-VPN) etc.

The hardware configuration of FIG. 10 is only for illustrative purposes. The present disclosure is not limited to the hardware configuration of FIG. 10. Any hardware configuration may be employed that can achieve the operation of the information processing device 10 of the embodiment of the present disclosure.

A program for causing hardware such as a CPU, a ROM, a RAM etc. which are included in a computer to provide functions similar to those of components of the above information processing device can be created. A computer-readable storage medium storing the program may be provided.

5. Summary

As described above, according to the information processing system of this embodiment, the information processing device obtains developer identification information related to the application d10 from the user terminal 20, and controls execution of APIs, depending on whether or not a developer indicated by the obtained developer identification information is a developer who has made an advance request for authorization for use. With such a configuration, the use of APIs can be limited, depending on developers.

Also, in the information processing system of this embodiment, a developer indicated by the developer identification information may be displayed as the developer information v10, or the developer identification information may be exposed on the network n1 between the user terminal 20 and the information processing device 10, whereby the developer is identifiably presented to the user. At this time, if the application d10 is provided for which APIs have been used without authorization, by a developer who pretends to be another developer who is authorized, a developer indicated when the application d10 is provided, and a developer indicated by the developer identification information, do not match. Therefore, even when APIs have been used without authorization, by a developer who pretends to be another developer who is authorized, a user who uses the application d10 can be caused to find that the developer pretends to be another developer who is authorized. If the user who uses the application d10 thus detects that the developer pretends to be another developer who is authorized, the user finds the unauthorized use by the developer, and concomitantly, the unauthorized use of APIs by a developer who pretends to be another developer who is authorized can be deterred.

Note that an example has been described above in which the process of displaying a developer indicated by the developer identification information as the developer information v10, and the process of exposing the developer identification information on the network n1 without performing an encryption process or an encoding process on the developer identification information, are both executed. However, only one of these processes may be executed if a user who uses the application d10 can be caused to find that the developer pretends to be another developer who is authorized.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below:

(1) An information processing device including:
an obtaining unit configured to obtain, from a user terminal, developer identification information, and access control information for controlling whether or not one or more functions possessed by the information processing device are permitted to be executed, the developer identification information and the access control information being related to an application program possessed by the user terminal;
a determination unit configured to determine whether or not a developer of the application program indicated by the developer identification information is a developer who has made an advance request for authorization for use; and
a control unit configured to control execution of at least a portion of the one or more functions based on the access control information, based on the result of the determination by the determination unit.

(2) The information processing device according to (1), wherein
the obtaining unit obtains, from the user terminal, the developer identification information on which an irreversible process has not been performed.

(3) The information processing device according to (2), wherein
the obtaining unit receives data transmitted from the user terminal, the data containing the developer identification information on which none of an encoding process and an encryption process has been performed, and obtains the developer identification information from the data.

(4) The information processing device according to any one of (1) to (3), further including:
a display control unit configured to cause the developer of the application program indicated by the developer identification information to be identifiably displayed.

(5) The information processing device according to (4), wherein
when the application program to which the developer identification information and the access control information are related is operating, the display control unit causes the developer of the application program indicated by the developer identification information to be identifiably displayed.

(6) The information processing device according to (4) or (5), further including:
a display unit, wherein
the display control unit causes the developer of the application program indicated by the developer identification information to be displayed.
(7) The information processing device according to any one of (1) to (6), wherein
the obtaining unit obtains first encoded information previously produced by encoding the developer identification information and the access control information based on predetermined key information, and
the determination unit encodes the developer identification information and the access control information obtained from the user terminal based on the key information to generate second encoded information, and based on whether or not the generated second encoded information and the obtained first encoded information match, determines whether or not the developer of the application program indicated by the obtained developer identification information is a developer who has made an advance request for authorization for use.
(8) The information processing device according to any one of (1) to (6), further including:
a key information generation unit configured to generate first key information for encoding, and outputs the generated first key information to the user terminal,
wherein
the obtaining unit obtains first encoded information produced by encoding, based on the first key information, encoded information previously produced by encoding the developer identification information and the access control information based on predetermined second key information, and
the determination unit encodes the developer identification information and the access control information obtained from the user terminal based on the second key information, encodes the encoded information output as a result of the encoding, based on the first key information, to generate second encoded information, and based on whether or not the generated second encoded information and the obtained first encoded information match, determines whether or not the developer of the application program indicated by the obtained developer identification information is a developer who has made an advance request for authorization for use.
(9) An information processing method including:
obtaining, from a user terminal, developer identification information, and access control information for controlling whether or not one or more functions possessed by the information processing device are permitted to be executed, the developer identification information and the access control information being related to an application program possessed by the user terminal;
determining whether or not a developer of the application program indicated by the developer identification information is a developer who has made an advance request for authorization for use; and
controlling execution of at least a portion of the one or more functions based on the access control information, based on the result of the determining.
(10) A program for causing a computer to execute:
obtaining, from a user terminal, developer identification information, and access control information for controlling whether or not one or more functions possessed by the information processing device are permitted to be executed, the developer identification information and the access control information being related to an application program possessed by the user terminal;
determining whether or not a developer of the application program indicated by the developer identification information is a developer who has made an advance request for authorization for use; and
controlling execution of at least a portion of the one or more functions based on the access control information, based on the result of the determining.

What is claimed is:

1. An information processing device, comprising:
a central processing unit (CPU) configured to:
obtain developer identification information and access control information from a user terminal, to control execution of at least one function of the information processing device,
wherein the developer identification information and the access control information are associated with an application program executed by the user terminal;
generate first key information;
output the generated first key information to the user terminal;
obtain, from the user terminal, first encoded information that is generated by a first encoding process on second encoded information based on the first key information;
encode the second encoded information based on the first key information to generate third encoded information,
wherein the second encoded information is generated by a second encoding process on the developer identification information and the access control information based on second key information different from the first key information;
determine a developer of the application program indicated by the developer identification information as the developer who made an advance request for authorization for use based on
a match of the generated third encoded information and the obtained first encoded information, and
a match of the second encoded information and the obtained first encoded information; and
control execution of at least a portion of the at least one function based on the access control information and the determination.

2. The information processing device according to claim 1, wherein
the CPU is further configured to obtain, from the user terminal, the developer identification information on which an irreversible process has not been performed.

3. The information processing device according to claim 1,
wherein the CPU is further configured to:
receive data transmitted from the user terminal, wherein the data comprises the developer identification information on which one of the second encoding process or an encryption process has not been performed, and
obtain the developer identification information from the data.

4. The information processing device according to claim 1,
wherein the CPU is further configured to control identifiable display of the developer of the application program indicated by the developer identification information, and wherein the developer identification information includes a developer name and identification information.

5. The information processing device according to claim 1, wherein the CPU is further configured to control identifiable display of the developer of the application program indicated by the developer identification information based on an operation of the application program to which the developer identification information and the access control information are associated.

6. The information processing device according to claim 1, further comprising:
a display device,
wherein the CPU is further configured to control display of the developer of the application program indicated by the developer identification information on the display device, and
wherein the developer identification information includes a developer name and identification information.

7. An information processing method, comprising:
obtaining developer identification information and access control information from a user terminal, for controlling execution of at least one function of an information processing device, wherein the developer identification information and the access control information are associated with an application program executed by the user terminal;
generating first key information;
outputting the generated first key information to the user terminal;
obtaining, from the user terminal, first encoded information that is generated by encoding second encoded information based on the first key information;
encoding the second encoded information based on the first key information to generate third encoded information,
wherein the second encoded information is generated by encoding of the developer identification information and the access control information based on second key information different from the first key information; and
determining a developer of the application program indicated by the developer identification information as the developer who made an advance request for authorization for use based on
a match of the generated third encoded information and the obtained first encoded information, and
a match of the second encoded information and the obtained first encoded information; and
controlling execution of at least a portion of the at least one function based on the access control information and the determination.

8. A non-transitory computer-readable medium having stored thereon, computer-executable instructions that, when executed by a processor, cause a computer to execute operations, the operations comprising:
obtaining developer identification information and access control information from a user terminal, for controlling execution of at least one function of an information processing device, wherein the developer identification information and the access control information are associated with an application program executed by the user terminal;
generating first key information;
outputting the generated first key information to the user terminal;
obtaining, from the user terminal, first encoded information that is generated by encoding second encoded information based on the first key information;
encoding the second encoded information based on the first key information to generate third encoded information,
wherein the second encoded information is generated by encoding of the developer identification information and the access control information based on second key information different from the first key information; and
determining a developer of the application program indicated by the developer identification information as the developer who made an advance request for authorization for use based on
a match of the generated third encoded information and the obtained first encoded information, and
a match of the second encoded information and the obtained first encoded information; and
controlling execution of at least a portion of the at least one function based on the access control information and the determination.

* * * * *